US006342457B1

(12) United States Patent
Best et al.

(10) Patent No.: US 6,342,457 B1

(45) Date of Patent: Jan. 29, 2002

(54) PRESSING CUSHION

(75) Inventors: Walter Best, Duren; Ralf Kaldenhoff, Aachen, both of (DE)

(73) Assignee: Thomas Josef Heimbach Gesellschaft mit Beschrankter Haftung & Co. (DE)

( * ) Notice: Subject to any disclaimer, the term of this patent is extended or adjusted under 35 U.S.C. 154(b) by 0 days.

(21) Appl. No.: 09/515,924

(22) Filed: Mar. 1, 2000

(30) Foreign Application Priority Data

Mar. 3, 1999 (EP) ........................................... 99104249

(51) Int. Cl.$^{7}$ .......................... D04B 1/18; D04B 11/12; D04B 21/14; D04B 7/16; B32B 15/14

(52) U.S. Cl. ....................... 442/306; 442/304; 442/308; 442/310; 442/311; 442/313; 442/314; 442/316

(58) Field of Search ................................ 442/304, 306, 442/311, 316, 308, 310, 313, 314; 66/8, 15

(56) References Cited

U.S. PATENT DOCUMENTS

| | | | | | |
|---|---|---|---|---|---|
| 3,968,296 A | * | 7/1976 | Nopper et al. | 428/256 |
| 4,037,009 A | * | 7/1977 | Severinsen | 428/241 |
| 4,948,658 A | | 8/1990 | Halker | 428/234 |
| 5,370,760 A | | 12/1994 | Mori et al. | 156/89 |
| 5,795,835 A | * | 8/1998 | Bruner et al. | 442/310 |
| 6,089,052 A | * | 7/2000 | Riegger | 66/195 |

FOREIGN PATENT DOCUMENTS

| | | |
|---|---|---|
| DE | 2338749 | 2/1975 |
| DE | 2319593 | 9/1976 |
| DE | 2627442 | 12/1977 |
| DE | 2650642 | 5/1978 |
| DE | 94189846 | 3/1995 |
| DE | 29518204 | 6/1996 |
| DE | 29721494 | 4/1998 |
| DE | 29721495 | 4/1998 |
| DE | 29721494.2 | 4/1998 |
| EP | 0290653 | 11/1988 |
| EP | 0493630 | 7/1992 |
| EP | 0920982 | 6/1999 |
| EP | 0920983 | 6/1999 |
| WO | 94/01373 | 1/1994 |

* cited by examiner

*Primary Examiner*—Terrel Morris
*Assistant Examiner*—Norca L. Torres
(74) *Attorney, Agent, or Firm*—Liniak, Berenato, Longacre & White, LLC

(57) ABSTRACT

The invention concerns a pressing cushion (1, 6) having a textile thread system (2, 3, 7 which is characterized in that the thread system has a knitted material (2) or is made of a knitted material (7).

20 Claims, 1 Drawing Sheet

Fig. 1
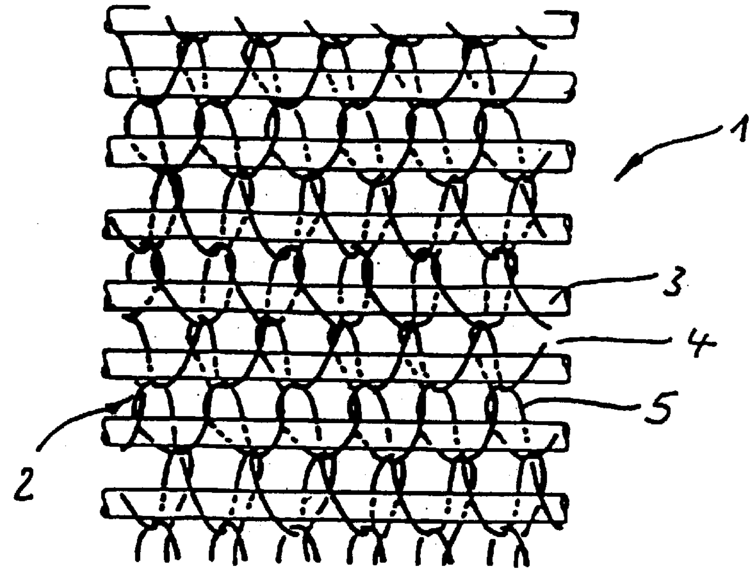
Fig. 2
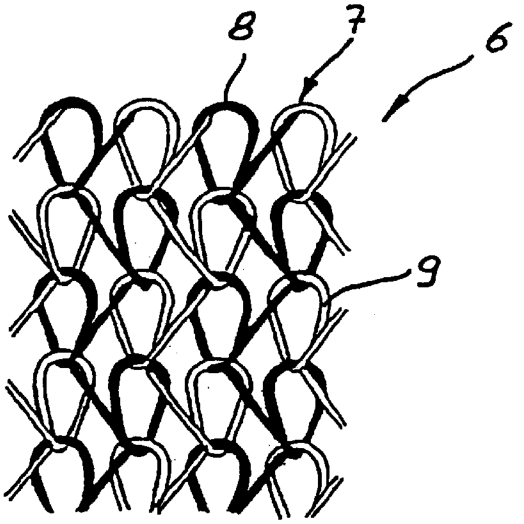
Fig. 4
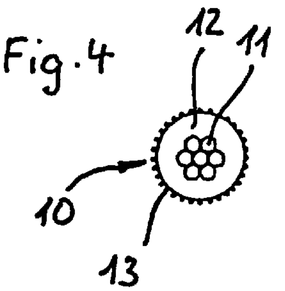
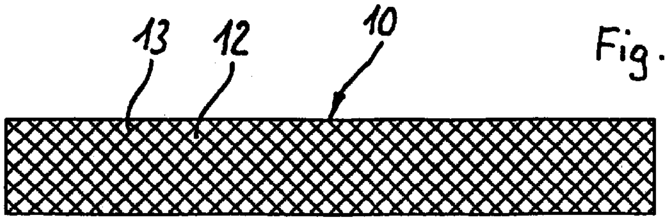
Fig. 3

PRESSING CUSHION

FIELD OF THE INVENTION

The invention concerns a pressing cushion having a textile thread system, for use in laminating presses.

BACKGROUND

The manufacture of layered materials, for example decoratively coated particle boards, is performed in laminating presses that can be configured as low- or high-pressure multiplaten presses or short-cycle presses. To ensure that the pressure of the press plates is transferred uniformly onto the pressed material over its entire surface, pressing cushions are inserted between the pressed material and the press plates. The pressing cushions must be capable of withstanding high pressures as well as the temperatures that occur in such presses, and they must be capable of transferring the heat proceeding from the press plates quickly and without major losses onto the pressed material. It is also desirable to be able to process pressed materials in different formats in succession with one pressing cushion.

Pressing cushions that are made of or contain a textile thread system in the form of a fabric are known. DE-B-23 19 593 discloses a pressing cushion whose basis is a metal sieve fabric that is enclosed in a matrix made of a silicone elastomer. The pressing cushion according to DE-A-23 38 749 has a glass fiber fabric in which individual or all threads are impregnated or coated with a plastic, for example a silicone elastomer. These threads are therefore elastic in thickness, and form the cushioning of the pressing cushion. The teaching of DE-A-26 50 642 is similar. EP-A-0 493 630 proposes a pressing cushion made of a textile fabric in which the fabric is composed of aromatic polyamide threads and metal threads. DE-U-295 18 204 discloses a pressing cushion in which one portion of the threads has a silicone elastomer and a further portion can be configured as metal wire. DE-U-94 18 984.6 describes a pressing cushion in which the threads can be made of a wide variety of materials, in particular of rubber, silicone elastomer, or metal, and a combination thereof. Lastly, DE-U-297 21 495 and DE-U-297 21 494 disclose pressing cushions made of a fabric in which the individual threads are interwoven and configured in a particular fashion.

With the known pressing cushions, the range of variation for designing the pressing cushion in accordance with requirements—in terms of elongation, compressive elasticity, structural strength, and thermal conductivity—is limited, so that an optimum result in terms of these properties cannot always be obtained. It is therefore the object of the invention to configure a pressing cushion in such a way that a wide range of possible variations for designing the press cushion exists, especially in terms of the aforesaid properties.

SUMMARY OF THE INVENTION

According to the present invention, this object is achieved in that the thread system has a knitted material or is made of a knitted material, i.e. constitutes at least substantially a knitted fabric, in particular a warp-knit fabric. Knitted materials of this kind can be manufactured in a variety of basic weaves, for example fringe, tricot, plain, sateen, velvet, and satin; the various basic weaves can also be combined with one another. In this way and also by way of the quantitative proportion of the threads of the thread system resulting from changes in needle gauge and stitch density, the properties of the pressing cushion can be adjusted in accordance with requirements within wide limits, especially in terms of elongation, structural strength, compressive elasticity, and thermal conductivity.

In a development of the invention, provision is made for the thread system to have additional threads that pass through the stitches of the knitted material. This creates an additional capability for influencing the properties of the pressing cushion. The additional threads can extend in the stitch wale direction or in the stitch row direction. An oblique layout in which the additional threads cross through multiple stitch rows is also possible.

According to a further feature of the invention, provision is made for the thread system to have thermally conductive threads that are made of or contain metal. Metals or metal alloys suitable in this context are, in particular, aluminum, bronze, stainless steel, copper, or brass. The thermally conductive threads can also be configured as plastic threads, for example made of aramid or polyimide, with a proportion of metal fibers or threads. The thermally conductive threads should alternate in any desired sequence with threads whose thermal conductivity is lower and which perform other functions. The alternation of these threads can occur both in the stitch row direction and in the stitch wale direction.

The invention furthermore provides for the thread system to have cushion threads that are elastic in thickness and impart compressive elasticity to the pressing cushion. These can alternate, in the stitch row direction and/or stitch wale direction, with the thermally conductive threads described above. The compressive elasticity can be adapted to particular requirements by selecting the layout and number of such cushion threads. The cushion threads can be part of the knitted material itself, and can also partially or completely constitute the additional threads.

The cushion threads can be made of an elastomeric material, for example silicone elastomer, fluorine rubber, or rubber. The elastomeric material can contain a metal, in powder form or as short fibers, in order to improve the thermal conductivity of the cushion threads. Also possible are cushion threads that each have a core thread which is surrounded by an elastomeric thread sheath. The core thread can be made of metal strands or of plastic threads made, for example, of aramids, polyimide, PPS, or PEEK, or combinations thereof. It can be configured as a monofilament, multifilament, twisted yarn, spun fiber yarn, braided strand, cord, ribbon, or the like, or as combinations thereof. The thermal conductivity is improved even further if at least a portion of the cushion thread is surrounded by metal wire, for example by winding, stranding, or braiding. The thickness of the cushion thread should be selected so that at the pressures usual in laminating presses, i.e. under press loads, the cushion thread assumes the same thickness as the metal thermally conductive threads. This ensures that the thread surfaces all lie in one plane during the pressing operation, thus yielding a maximum pressing area and thus uniform contact pressure, as well as optimized thermal conduction.

In a further embodiment of the invention, provision is made for the thread system to be received in an elastomeric matrix, such that said matrix can also be made of silicone elastomer or fluorosilicone elastomer or other rubber materials. To improve thermal conductivity, the matrix should also contain metal particles in the form of powders or short fibers.

Lastly, provision is made according to the invention for the pressing cushion to have edge thickenings in order to ensure uniform contact pressure over the entire surface. The edge thickening can be achieved, for example, by a local increase in the needle gauge and thus in the stitch density.

The invention is illustrated in more detail, with reference to exemplary embodiments, in the drawings, in which:

BRIEF DESCRIPTION OF THE DRAWINGS

FIG. 1 shows a plan view of a portion of a pressing cushion made of a warp-knit fabric having additional threads;

FIG. 2 shows a plan view of a portion of another pressing cushion made of a warp-knit fabric;

FIG. 3 shows a side view of a cushion thread; and

FIG. 4 shows a cross section through the cushion thread of FIG. 3.

DETAILED DESCRIPTION OF THE INVENTION

Pressing cushion 1 depicted in FIG. 1 comprises a thread system in the form of a warp-knit fabric 2 having additional cushion threads, labeled 3 by way of example. Warp-knit fabric 2 forms stitch rows 4 by way of example; in each stitch row 4, a cushion thread 3 passes through the stitches, labeled 5 by way of example.

Warp-knit fabric 2 comprises thermally conductive threads, specifically in this case copper threads. Cushion threads 3 are configured as silicone elastomer monofilaments. It is also possible to use, instead of such silicone elastomer monofilaments, cushion threads of the kind depicted in FIGS. 3 and 4 and described below. Warp-knit fabric 2 made of copper threads ensures good thermal transfer from surface to surface, while cushion threads 3 guarantee the elasticity in thickness necessary for conformity with the pressed material and the press plate.

Pressing cushion 6 depicted in FIG. 2 comprises a warp-knit fabric 7. In this warp-knit fabric 7, a thermally conductive thread 8 and a cushion thread 9 (drawn in solid black) alternate respectively in the stitch row and stitch wale direction. Thermally conductive threads 8 are here again configured as copper threads, while cushion threads 9 represent silicone elastomer monofilaments. Their functions are the same as in the case of pressing cushion 1 shown in FIG. 1, i.e. thermally conductive threads 8 ensure good thermal transfer between the two surfaces of pressing cushion 6, while cushion threads 9 ensure compressive elasticity.

FIGS. 3 and 4 depict a particular cushion thread 10. It has as its core thread a wire strand 11 made of copper that is surrounded by a thread sheath 12 made of a silicone elastomer. Thread sheath 12 is additionally overbraided on its outer side with copper wires (13 by way of example). This additionally imparts a high level of thermal conductivity to cushion thread 10, along with its elasticity in thickness. When cushion threads 10 of this kind are used in pressing cushion 6, it is important to ensure that cushion thread 10 has, under press loading, the same thickness as thermally conductive threads 8, so that the thread surfaces of both thermally conductive threads 8 and cushion threads 10 all lie in a single plane during the pressing operation, and a maximum pressing area and uniform contact pressure are thus achieved.

We claim:

1. A pressing cushion for use in a laminating press with a material to be laminated, said pressing cushion having a knitted textile thread system, wherein said thread system includes a plurality of cushion threads and a plurality of knit threads, each of said knit threads forming a first knitted loop around a cushion thread and then forms a second knitted loop around an adjacent cushion thread so that said pressing cushion transfers high pressing forces from the laminating press uniformly to the material to be laminated.

2. The pressing cushion as defined in claim 1, wherein at least some of said knit threads are thermally conductive.

3. The pressing cushion as defined in claim 2, wherein said thermally conductive knit threads alternate with threads whose thermal conductivity is lower.

4. The pressing cushion as defined in claim 1, wherein said cushion threads are elastic in thickness.

5. The pressing cushion as defined in claim 4, wherein said cushion threads each have a core thread which is surrounded by an elastomeric thread sheath.

6. The pressing cushion as defined in claim 5, wherein the thread sheath is made of a silicone elastomer or fluorosilicone elastomer.

7. The pressing cushion as defined in claim 4, wherein at least a portion of said cushion threads is surrounded by metal wire.

8. The pressing cushion as defined in claim 1, wherein the thread system is received in an elastomeric matrix.

9. The pressing cushion as defined in claim 8, wherein the matrix is made of silicone elastomer or fluorosilicone elastomer.

10. The pressing cushion as defined in claim 9, wherein the matrix contains metal particles.

11. The pressing cushion as defined in claim 1, wherein the pressing cushion has edge thickenings.

12. The pressing cushion as defined in claim 2, wherein said thermally conductive threads are made of or contain metal.

13. The pressing cushion as defined in claim 1, wherein said thermally conductive knit threads are made of plastic and metal.

14. The pressing cushion as defined in claim 1, wherein each of said cushion threads has a structure selected from the group consisting of monofilament, multifilament, twisted yarn, spun fiber yarn, braided strand, cord, ribbon and one or more combinations thereof.

15. The pressing cushion as defined in claim 1, wherein said thread system is a warp-knit fabric.

16. The pressing cushion as defined in claim 15, wherein said warp-knit fabric has a weave selected from the group consisting of fringe, tricot, plain, sateen, velvet, satin, and combinations thereof.

17. The pressing cushion as defined in claim 15, wherein loops formed by said cushion threads and loops formed by said knit threads alternate in a stitch row direction.

18. The pressing cushion as defined in claim 15, wherein loops formed by said cushion threads and loops formed by said knit threads alternate in a stitch wale direction.

19. The pressing cushion as defined in claim 1, wherein a compressed outer diameter of each of said cushion threads is the same as that of said knit threads when the pressing cushion is under a pressing load of the laminating press.

20. A pressing cushion for use in a laminating press with a material to be laminated, said pressing cushion having a knitted textile thread system, wherein said knitted textile thread system includes a plurality of cushion threads and a plurality of knit threads, each of said knit threads forming a first knitted loop around a cushion thread and then forms a second knitted loop around an adjacent cushion thread, wherein at least some of said cushion threads and said knit threads are thermally conductive so that said pressing cushion repeatedly withstands high pressing forces and temperatures from the laminating press.

* * * * *